V. W. PAGÉ.
SPRING SUSPENSION.
APPLICATION FILED APR. 5, 1921.

1,423,451. Patented July 18, 1922.

WITNESSES
Thomas Reichert
P. N. Pattison

Inventor
VICTOR W. PAGÉ
By Attorney

UNITED STATES PATENT OFFICE.

VICTOR W. PAGÉ, OF NEW YORK, N. Y.

SPRING SUSPENSION.

1,423,451.   Specification of Letters Patent.   Patented July 18, 1922.

Application filed April 5, 1921. Serial No. 458,655.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Spring Suspension, of which the following is a full, clear, and exact description.

The present invention relates to new and useful improvements in spring suspensions for vehicles and it pertains more particularly to the construction of a front spring for motor vehicles.

It is one of the objects of the invention to provide in combination with the front axle of a vehicle, resilient means for supporting the forward end of the chassis.

It is a further object of the invention to combine with this new and novel form of spring suspension, a new and novel arrangement of front axle radius rod.

It is a further object of the invention to provide two independent springs for supporting the chassis, one of which springs is substantially normally inoperative under light weights and in traveling over smooth roads.

It is a further object of the invention to so construct these springs that one of the spring elements under normal operating conditions forms a lever for transmitting the weight to the other of the spring elements until such time when the second-mentioned spring element will be prevented from acting, at which time the first-mentioned spring element serves to function to resiliently support the load of the chassis.

With the above and other objects in view, reference is had to the accompanying drawing, in which—

Figure 1:
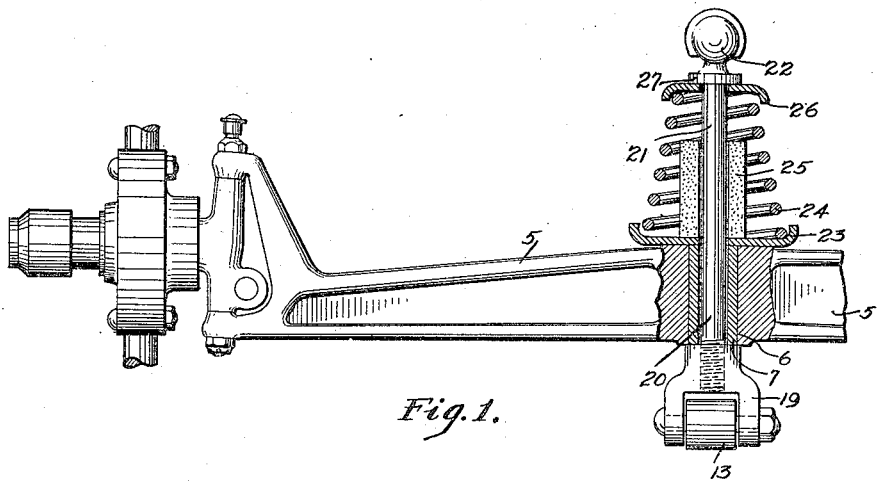
Figure 1 is a detail view of a portion of a front axle partly in section, showing the method of attachment of a spring suspension constructed in accordance with the present invention.
Figure 2:
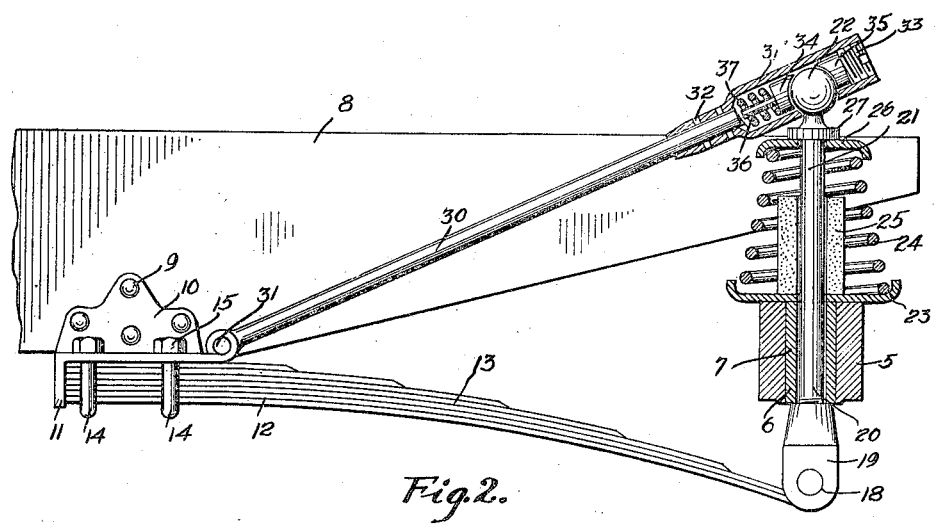
Fig. 2 is a view in elevation partly in section taken at right angles to Fig. 1.

Referring more particularly to the drawing, the reference character 5 designates the axle and said axle is provided near each of its ends with passages 6, said passages being lined with bushings 7. It is to be understood that the mechanism shown in the drawings and described in the specification is duplicated upon opposite sides of the machine.

The reference character 8 designates one of the side frames of a motor vehicle chassis, and secured to said side frame by means of rivets or the like 9, is a spring bracket 10, and this spring bracket 10 is provided, in the preferred form of the invention, with a shoulder 11, against which the several leaves 12 of a spring 13 are adapted to abut. The spring 13 is secured to the spring bracket 10 by means of clips 14, which embrace the spring 13 and are secured in position by means of nuts or the like 15. The free end of the spring 13 is pivotally connected as at 18 to a head member 19 carried by a bolt 20, and said bolt 20 is adapted to be slidably mounted in the bushing 7 in the passage 6 of the axle 5.

The upper end of this bolt 20 is extended beyond the upper face of the axle as indicated by the reference character 21 and said bolt is provided upon its upper extremity with a spherical head or knob 22. The reference character 23 designates a cup or plate mounted upon the top face of the axle 5 and resting upon said cup or plate and surrounding the upper end 21 of the bolt 20, is a coil spring 24. The upper end of this coil spring 24 engages a cup or plate 26 which latter has a shoulder 27 formed upon the upper end 21 of the bolt 20 in such a manner that the coil spring 24 is maintained between the cups 26 and 23.

Surrounding the upper end 21 of the bolt 20 and positioned within the coil spring 24, is a block 25, preferably of resilient material, such as rubber. It is to be noted, however, that this block does not necessarily have to be of a resilient nature as will be hereinafter more clearly brought out.

The reference character 30 designates a radius rod and said radius rod is pivotally connected as at 31 to the spring bracket 10. The forward end of the radius rod is provided with a housing 31' rigidly secured to the radius rod 30 by means of rivets, bolts, or the like 32. The outer end of this housing 31 is closed, by means of a screw-threaded plug 33, and mounted in the housing 31 are two blocks 34 and 35, each of which has a curved surface adapted to engage the spherical head or knob 22 of the bolt 20. The block 34 is provided with a stem 36, and surrounding said stem 36 is a coil spring 37, by means of which the block is at all times forced into engagement with the spherical head 22, the block 34 being maintained in engagement with the spherical head 22 by means of the screw-threaded plug 33.

The device operates in the following manner:

As above stated, the mechanism shown in the drawing is duplicated upon opposite sides of the machine, and when the machine is at rest, it will be seen that the weight thereof is transmitted from the side frame 8 through the spring members 13. These spring members 13 being of greater rigidity than the coil springs 24, serve as levers to transmit the weight to the lower end of the bolt 20, and to carry said weight suspended upon the coil springs 24.

By this construction it will be apparent that the entire weight of the body of the vehicle under normal conditions will be suspended from the springs 24.

Assuming now that the weight of the load is increased or due to sudden shock the spring 24 is compressed to a point where the upper plate or cap 26 would engage the upper end of the block 26. After the plate or cap 26 has engaged the top of the block 25, the spring 13 begins to function to resiliently support the load of the body, thus providing a spring suspension which under normal conditions is readily responsive to slight variations or unevenness in the road and at the same time a spring suspension which is capable of carrying maximum loads and withstanding sharp and sudden impacts due to inequalities or unevenness of the road.

By pivotally connecting the radius rod 30 at the point 31, it will be seen that the same is free to rock about said pivotal point 31 during the action of the resilient members 13 and 24, and at the same time the outer end of said radius rod is free to move in a vertical plane together with the rod 20, it being understood that the axle 5 is free to rock within the hubs of the wheels mounted upon its ends.

I claim:

1. A spring suspension for vehicles comprising a cantilever spring rigidly secured at one end to the frame of the vehicle, a radius rod pivotally secured at one end to the frame of the vehicle at the point of securement of the cantilever spring, an axle provided with a perforation, a rigid member slidably mounted in said perforation, said rigid member being pivotally connected to the cantilever spring and to the radius rod, a coil spring interposed between the top face of said axle and the upper end of said rigid connecting member, and means for engagement with the upper end of said rigid connecting member to limit the sliding movement thereof relative to the axle upon compression of said coil spring to a predetermined degree.

2. A spring suspension comprising a perforated axle, a bolt slidably mounted in the perforations of said axle, a spring associated with said bolt and adapted to influence the movement of said sliding bolt, a main spring attached to one end of said bolt, and a radius rod attached to the opposite end of said bolt and to said second-mentioned spring.

3. A spring suspension for vehicles comprising in combination with the frame and axle of a vehicle, a spring rigidly attached at one end to the vehicle frame, a bolt pivotally secured to the opposite end of said spring, said bolt being slidably mounted on the axle, a coil spring surrounding said bolt and adapted to be placed under compression by said bolt during its movement in the axle, and means for limiting the sliding movement of said bolt to throw the load to the first-mentioned spring.

4. A spring suspension for vehicles comprising in combination with the vehicle frame and axle, a rigid member slidably mounted in the axle, a spring rigidly connected at one end to the vehicle and pivotally connected at the other end to said slidable rigid member, a coil spring surrounding said rigid member and interposed between one end thereof and the axle, and a radius rod pivotally connected to the frame and to one end of said rigid slidable member.

5. A spring suspension for vehicles comprising in combination with the vehicle frame and axle, a rigid member slidably mounted in the axle, a coil spring interposed between one end of the rigid member and the axle, said coil spring being adapted to be placed under tension by sliding movement of the rigid member, a spring rigidly connected to the frame and pivotally connected to the lower end of the rigid member, and means for limiting the sliding movement of the rigid member relative to the axle in one direction, said means serving to throw the load from the coil spring to the second-mentioned spring when the sliding movement of the rigid member is retarded.

6. In combination with a vehicle frame and axle, a radius rod pivotally secured to the frame, a resilient member rigidly secured to the frame, a rigid member connecting the radius rod with the resilient member, and means for slidably mounting said rigid member in said axle.

7. In combination with a vehicle frame and axle, a radius rod pivotally secured to said frame, a resilient member secured to the frame, and a rigid member connecting the radius rod and the resilient member, said rigid connecting member being slidably supported with respect to the axle and forming the means for connecting the axle to the vehicle frame.

8. A device of the class described including a cantilever spring and a radius rod adapted to be secured at one end, respectively, to a chassis, means connecting the opposite ends of said cantilever spring and radius rod to secure them to an axle, and resilient means supported upon the axle and surrounding said connecting means for yieldingly mounting the cantilever spring and radius rod relatively to said axle.

9. A spring suspension for vehicles comprising a spring member rigidly secured to the vehicle frame, a radius rod pivotally secured to the vehicle frame, an axle, a rigid member slidably mounted in said axle and having one of its ends connected to said resilient member and its other end connected to said radius rod, and resilient means surrounding the rigid member slidably mounted in the axle.

10. A spring suspension for vehicles comprising a resilient member rigidly secured to the frame of the vehicle, a rigid member pivotally secured to the frame of the vehicle, an axle, a rigid member slidably mounted within the axle and having its ends connected to the resilient member and the first-mentioned rigid member, and resilient means mounted upon the axle and supporting one of the ends of the rigid member slidably mounted therein.

11. A spring suspension for vehicles comprising a resilient member rigidly secured to the vehicle frame, a radius rod pivotally secured to the vehicle frame, an axle, a rigid member slidably mounted with respect to said axle and having its ends connected to the resilient member and the radius rod, and resilient means for limiting the sliding movement of the rigid member relative to the axle.

12. A spring suspension for vehicles comprising a cantilever spring rigidly secured to the vehicle frame, a radius rod pivotally secured to the vehicle frame, an axle, a rigid member slidably mounted in said axle and connected to said cantilever spring and said radius rod, a coil spring carried by the axle and adapted to support the rigid member connecting the cantilever spring and the radius rod, and cushion means carried by the axle and adapted for engagement with the rigid member connecting the cantilever spring and the radius rod to restrict sliding movement of the rigid member and transfer the load of the vehicle therefrom to the cantilever spring.

VICTOR W. PAGÉ.